(12) United States Patent
Ortiz

(10) Patent No.: US 7,743,845 B2
(45) Date of Patent: Jun. 29, 2010

(54) COMBINATION GARDEN TILLER AND SPRINKLER HEAD GRASS TRIMMER

(76) Inventor: George A. Ortiz, 14578 San Cristabal Dr., La Mirada, CA (US) 90638

( * ) Notice: Subject to any disclaimer, the term of this patent is extended or adjusted under 35 U.S.C. 154(b) by 0 days.

(21) Appl. No.: 12/463,033

(22) Filed: May 8, 2009

(65) Prior Publication Data

US 2009/0255696 A1 Oct. 15, 2009

Related U.S. Application Data

(63) Continuation-in-part of application No. 11/653,821, filed on Jan. 16, 2007, now abandoned.

(60) Provisional application No. 60/761,836, filed on Jan. 25, 2006.

(51) Int. Cl.
*A01B 1/00* (2006.01)
(52) U.S. Cl. .................................. 172/371; 172/13
(58) Field of Classification Search ............. 172/13–15, 172/21, 22, 25, 37, 41, 44, 48, 50–52, 110, 172/371, 373, 374, 375, 378, 719, 772.5; 30/51, 68, 123, 276, 314–316, 349, DIG. 7
See application file for complete search history.

(56) References Cited

U.S. PATENT DOCUMENTS

| 941,589 | A | * | 11/1909 | Roper | 172/25 |
|---|---|---|---|---|---|
| 1,857,383 | A | * | 5/1932 | Johnson | 30/316 |
| 2,385,441 | A | * | 9/1945 | Hill | 172/25 |
| 2,991,838 | A | * | 7/1961 | Lane | 175/220 |
| 3,062,299 | A | * | 11/1962 | Koepfinger | 172/18 |
| 3,111,995 | A | * | 11/1963 | Dahl | 172/18 |
| 3,129,771 | A | * | 4/1964 | Lidstone | 172/25 |
| 3,143,176 | A | * | 8/1964 | Drane, Jr. | 172/13 |
| 3,174,224 | A | * | 3/1965 | Rousselet | 30/264 |
| 3,555,680 | A | * | 1/1971 | Ford | 30/276 |
| 3,743,027 | A | * | 7/1973 | Hatfield | 172/13 |
| 3,905,103 | A | * | 9/1975 | Ford et al. | 30/276 |
| 4,022,283 | A | * | 5/1977 | Morgan | 172/15 |
| 4,547,966 | A | * | 10/1985 | Eden | 30/300 |
| 4,832,131 | A | * | 5/1989 | Powell et al. | 172/25 |
| 5,207,466 | A | * | 5/1993 | Ohlson | 294/61 |
| 5,242,024 | A | * | 9/1993 | Van Houten | 172/19 |
| 5,441,118 | A | * | 8/1995 | Cruz, Jr. | 172/378 |
| 5,461,788 | A | * | 10/1995 | Taylor | 30/300 |

(Continued)

*Primary Examiner*—Robert E Pezzuto
*Assistant Examiner*—Matthew D Troutman
(74) *Attorney, Agent, or Firm*—Borton Petrini, LLP; Jeffrey A. Travis, Esq.

(57) ABSTRACT

Apparatus for trimming grass around sprinkler heads or tending a small garden area includes a first housing member having a plurality of serrations formed on one end for cutting grass around such sprinkler heads. A second housing member partially disposed for reciprocal movement within the first housing member. A first elongated rod like member is passed through the center apertures in each housing member and the another elongated rod like member engages an end of such first elongated rod like member. A caged biasing spring is disposed over the second rod like member for aiding in reciprocal movement of the second housing member. A resilient elastomeric member is provided for absorbing shock during use of apparatus for tending such small garden area and a mechanism for manipulating the apparatus while trimming such grass around such sprinkler head or tending such small garden area.

12 Claims, 3 Drawing Sheets

U.S. PATENT DOCUMENTS

| | | | |
|---|---|---|---|
| 6,412,568 B1 * | 7/2002 | Thede | 172/13 |
| 6,736,217 B2 * | 5/2004 | Brown | 172/41 |
| 6,854,524 B1 * | 2/2005 | Williams | 172/13 |
| 7,117,954 B2 * | 10/2006 | Vipond | 172/378 |

* cited by examiner

COMBINATION GARDEN TILLER AND SPRINKLER HEAD GRASS TRIMMER

CROSS REFERENCE TO RELATED APPLICATION

This application is a Continuation-In-Part of U.S. patent application Ser. No. 11/653,821 filed Jan. 16, 2007, now abandoned and claiming priority from U.S. Provisional Patent Application Ser. No. 60/761,836 filed Jan. 25, 2006. This application is also related to U.S. patent application Ser. No. 12/074,076 filed Feb. 29, 2008 and U.S. patent application Ser. No. 12/074,016 filed Mar. 3, 2008, both Divisional Applications of the parent U.S. patent application Ser. No. 11/653,821.

FIELD OF THE INVENTION

The present invention relates, in general, to lawn and garden type equipment and, more particularly, this invention relates to a combination turbo garden tiller and a grass trimmer for trimming the grass around the head of a lawn water sprinkler.

BACKGROUND OF THE INVENTION

Prior to the conception and development of the present invention, as is generally well known in the prior art, garden tillers and grass trimmers have been sold commercially and are generally in widespread use.

The numerous prior art type garden tillers, which are known to Applicant, are normally rather large and are, therefore, usually not used for small jobs such as tending a small flower garden. Additionally, the prior art type grass trimmers are not specifically designed to trim a circle as is needed around the head of a lawn water sprinkler. Furthermore, to the best of Applicant's knowledge, there is not a single implement presently available on the market which can be readily adapted to do each of these jobs in an efficient manner.

SUMMARY OF THE INVENTION

The present invention provides, in a first aspect, a grass trimmer for trimming the grass from around the head of a lawn water sprinkler system. The grass trimmer includes an elongated generally hollow first housing member closed at a first end thereof. Such elongated generally hollow first housing member having each of a predetermined length and a predetermined diameter. There is a plurality of serrations formed on a second axially opposed end of the elongated generally hollow first housing member for cutting grass disposed around such head portion of such lawn water sprinkler. An elongated generally hollow second housing member at least partially disposed for reciprocal movement within such elongated generally hollow first housing member. The elongated generally hollow second housing member being open at a first end thereof and having each of a predetermined length and a predetermined cross-sectional shape in a direction transverse to such predetermined length. An elongated rod like member is also provided. A biasing means is disposed over such elongated rod like member and caged between the elongated generally hollow second housing member and the inner surface of the first end of the elongated generally hollow first housing member. Additionally, a means engageable with the first closed end of such elongated generally hollow first housing member is provided for manipulating such apparatus for trimming such grass from around such head portion of such lawn water sprinkler system.

In a second aspect, the present invention provides a relatively small garden tiller for at least one of tending, tilling and cultivating the ground around a small garden area to remove unwanted vegetation. Such garden tiller includes a first elongated rod like member having each of a predetermined length and a first predetermined cross-sectional shape in a direction transverse to such predetermined length. A predetermined number of tine members are secured to an outer surface of the elongated rod like member adjacent a first end thereof for penetrating a ground surface in order to at least one of till, weed and cultivate a small garden area. A second elongated rod like member engageable at a first end thereof with a second axially opposed end of said first elongated rod like member is provided. A biasing means is disposed over such second elongated rod like member and caged between a pair of plate like members and a means engageable with a second end of such second elongated rod like member is provided for manipulating such apparatus during such at least one of tilling, weeding and cultivating a small garden area.

The instant invention, in a third and final aspect, provides a combination garden tiller and grass trimmer for at least one of trimming around a lawn water sprinkler head and at least one of tilling, weeding and cultivating a small garden area. This combination garden tiller and grass trimmer for trimming around a lawn water sprinkler head includes an elongated generally hollow first housing member closed at a first end thereof. Such elongated generally hollow first housing member having each of a predetermined length and a predetermined diameter. A plurality of serrations are formed on a second axially opposed end of the elongated generally hollow first housing member for cutting grass disposed around such head portion of such lawn water sprinkler. An elongated generally hollow second housing member at least partially disposed for reciprocal movement within such elongated generally hollow first housing member. The elongated generally hollow second housing member being open at a first end thereof and having each of a predetermined length and a predetermined cross-sectional shape in a direction transverse to such predetermined length. A first elongated rod like member having each of a predetermined length and a first predetermined cross-sectional shape in a direction transverse to said predetermined length is provided to receive a predetermined number of tine members secured to an outer surface thereof adjacent a first end for penetrating a ground surface to at least one of till, weed and cultivate a small garden area. A second elongated rod like member engages at a first end thereof with a second axially opposed end of the first elongated rod like member. A biasing means is disposed over such second elongated rod like member and caged between the elongated generally hollow second housing member and the inner surface of the first end of the elongated generally hollow first housing member. There is a means engageable with one of such first closed end of the elongated generally hollow tubular member and such second end of such elongated rod like member for manipulating such apparatus for at least one of trimming such grass from around such head portion of such lawn sprinkler and at least one of tilling, weeding and cultivating a small garden area.

OBJECTS OF THE INVENTION

It is, therefore, one of the primary objects of the present invention to provide a combination garden tiller and grass trimmer for trimming grass from around the head of a lawn water sprinkler system which is easy to use.

Another object of the present invention is to provide a combination garden tiller and grass trimmer for trimming grass from around the head of a lawn water sprinkler system which is less expensive to purchase than when these two items are purchased as separate units.

Still another object of the present invention is to provide a combination garden tiller and grass trimmer for trimming grass from around the head of a lawn water sprinkler system which is relatively lightweight.

Yet another object of the present invention is to provide a combination garden tiller and grass trimmer for trimming grass from around the head of a lawn water sprinkler system which requires less storage space than presently available equipment.

A further object of the present invention is to provide a combination garden tiller and grass trimmer for trimming grass from around the head of a lawn water sprinkler system which can be power operated or manually operated.

An additional object of the present invention is to provide a combination garden tiller and grass trimmer for trimming grass from around the head of a lawn water sprinkler system which will reduce the time required to till a relatively small area and to trim around a water sprinkler head.

In addition to the various objects and advantages of the present invention described with some degree of specificity above it should be obvious that additional objects and advantages of the combination garden tiller and grass trimmer will become more readily apparent to those persons who are skilled in the relevant art from the following more detailed description of the invention, particularly, when such description is taken in conjunction with the attached drawing figures and with the appended claims.

Figure 1:
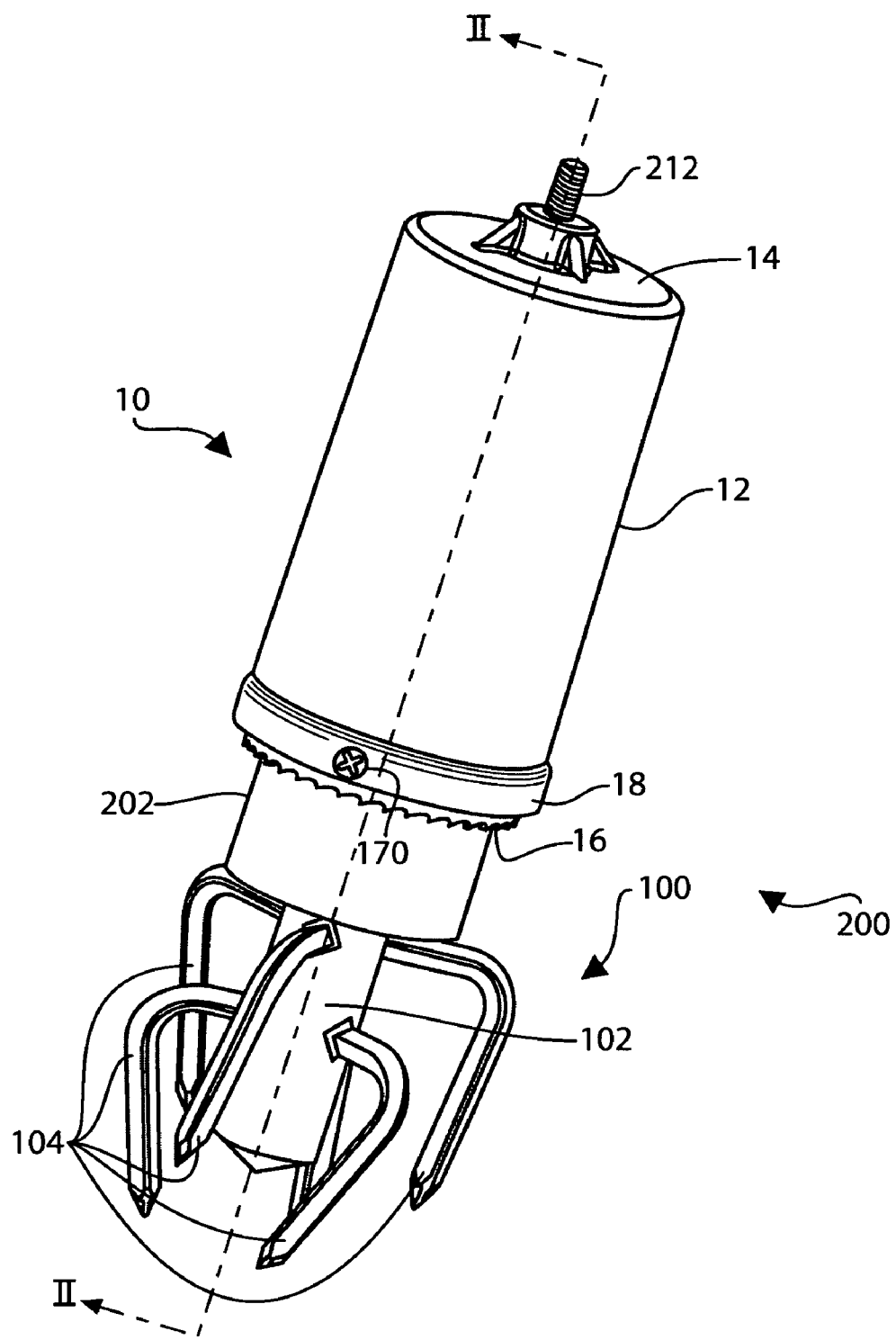
FIG. 1 is an isometric view showing the combination garden tiller and grass trimmer for trimming around a lawn water sprinkler head assembled as it would be used for tilling.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 3:
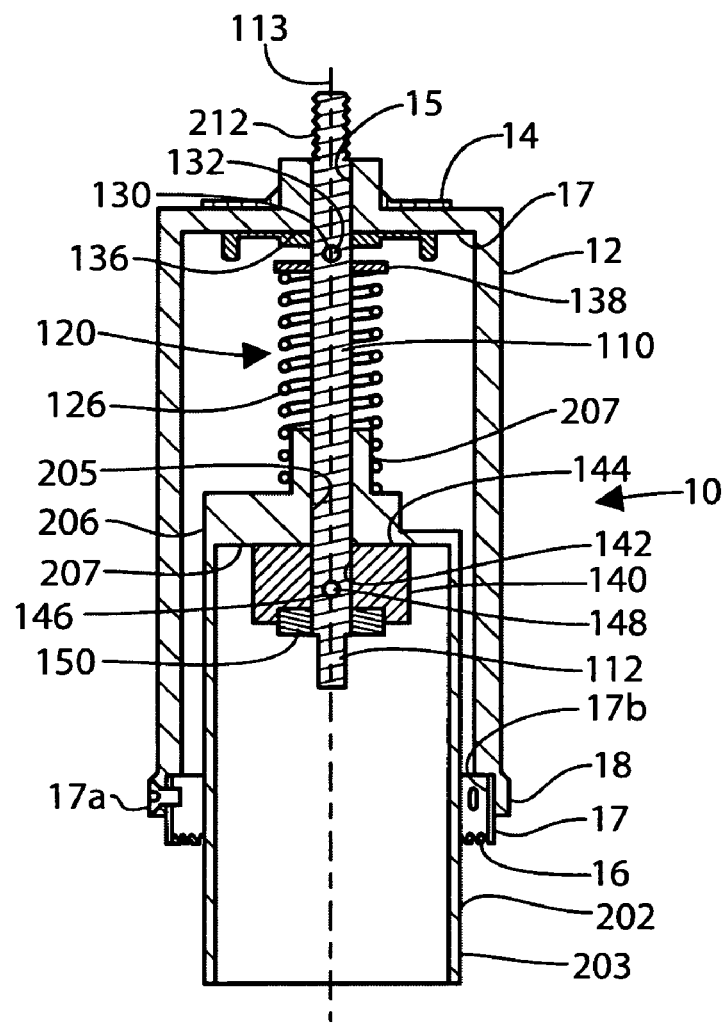
FIG. 3 is a partial isometric cross-sectional view of the combination garden tiller and grass trimmer for trimming around a lawn water sprinkler head illustrated.
Figure 4:
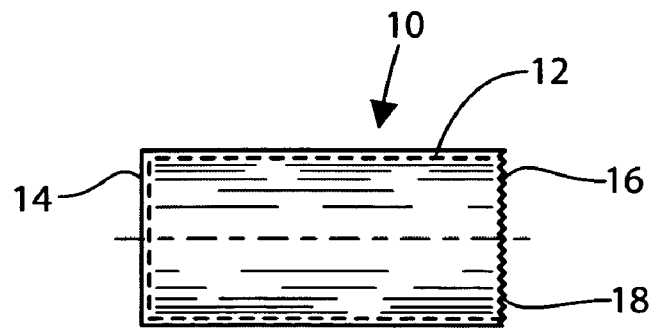
FIG. 4 is a side elevation view of the combination garden tiller and grass trimmer for trimming around a water sprinkler head illustrating the apparatus assembled for use as a grass trimmer for trimming around a lawn water sprinkler head.

Reference is now made, more particularly, to FIGS. 3-4 of the drawings. Illustrated therein is a presently preferred embodiment of a grass trimming apparatus, generally designated 10, for trimming grass from around the head of a lawn water sprinkler (not shown).

Such apparatus 10 includes a first generally hollow housing member 12 closed at a first end 14 thereof that may be provided with a center boss 14a. A center aperture 15 is formed through the first end 14 in substantial alignment with a longitudinal axis of the first housing member 12. The first elongated generally hollow housing member 12 having each of a predetermined length and a predetermined inside diameter which allows clearance around the head (not shown) of the lawn water sprinkler system (not shown). Preferably, such predetermined inside diameter is generally about 3.0 inches. The predetermined length is greater that the predetermined diameter. The peripheral side wall of the first elongated generally hollow housing member 12 is preferably tapered at a predetermined angle from the first end 14 to the axially opposed second end 18 in order to improve rigidity of the generally hollow first housing member 12. The elongated generally hollow first housing member 12 may be also provided as a generally hollow tubular member.

There is a plurality of serrations 16 formed on a second axially opposed end 18 of such first elongated generally hollow housing member 12 for cutting grass disposed around such head portion of such lawn water sprinkler system. In the most presently preferred embodiment of the invention such second axially opposed end 18 of such first elongated generally hollow housing member 12 is heat treated for hardening.

Now in reference to FIG. 4, the serrations 16 may be formed integral with the second end 18. However, it is presently preferred, as best shown in FIG. 3, to provide a replaceable portion 17 for the serrations 16 on the grass trimming apparatus 10. Such replaceable portion 17 is in the form of an annular band saw blade. Preferably, the diameter of the end 18 of the first elongated generally hollow housing member 12 is enlarged to accept the replaceable portion 17 and secure such replaceable portion 17 with threaded fasteners 17a. It is further preferred to provide an annular shoulder 17b so as to securely seat the replaceable portion 17.

Although, the replaceable portion 17 has been shown as disposed internal to the second end 18 of the first elongated generally hollow housing member 12, it may be positioned external thereto.

In accordance with a presently preferred embodiment of the invention, there is also an second elongated generally hollow housing member 202 at least partially disposed for reciprocal movement within such first elongated generally hollow housing member 12. In this embodiment of the invention, such second elongated generally hollow housing member 202 is open at a first end 203 thereof and has each of a predetermined length and a predetermined cross-sectional shape in a direction transverse to such predetermined length. The first end 203 is disposed generally adjacent the open end 18 of the first elongated generally hollow housing member 12. An aperture 205 is axially formed though the second end 206 of the second elongated generally hollow housing member 202. The peripheral side wall of the second elongated generally hollow housing member 202 may be also taper outwardly toward the first end 203.

An elongated rod like member 110 is passed through each aperture 15 and 205 and has a first threaded end 112 thereof extending into the interior of the second elongated generally hollow housing member 202. The axially opposed second end 212 of the elongated rod like member 110 extends outwardly from the first end 14 through the center aperture 15 formed therethrough. Preferably, such second end 212 is threaded. In the most presently preferred embodiment of the invention a cross-sectional shape of such elongated rod like member 110 is generally hexagonal.

A pair of stop members is provided to inhibit axial movement of the elongated rod like member 110. The first stop member is a pin 132 inserted into an aperture 130 formed through the elongated rod like member 110 adjacent to and spaced from the second end 212 thereof transverse to the longitudinal axis of the elongated rod like member 110. Each end of the pin 132 extends outwardly from the outer surface of the elongated rod like member 110 and abuts an inner surface 17 of the first end 14. The pin 132 is selected from a group consisting of solid, roll, spiral and the like pins generally used for securing a pair of members therebetween. When the first elongated generally hollow housing member 12 is manufactured from materials having lower tensile strength than steel, for example such as plastics, aluminum and the like materials, it has been found necessary to position a washer 136 between such inner surface 17 and the pin 130. The washer may be manufactured from any material, but is preferably manufactured from steel to improve life of the apparatus 10.

The second stop member 140 preferably has a generally disk shape. Such second stop member 140 further has a center aperture 142 formed therethrough and sized to receive the outer surface of the elongated rod like member 110. Subsequently, such second stop member 140 is secured on the elongated rod like member 110. The presently preferred method of securing the second stop member 140 is by way of an aperture 146 formed through each of the elongated rod like member 110 and the stop member 140 transverse to the longitudinal axis 113 of the elongated rod like member 110 and a pin 148 inserted into such aperture 146 and which may be identical to the above described pin 132. Although it is within the scope of the present invention to employ other methods of securing the second stop member 140 onto the elongated rod like member 110, including a threaded connection, interference fit, adhesives and the like means. A first end 144 of the second stop member 140 abuttingly engages inner surface 207 of the second end 206.

A biasing means 120 is disposed over such elongated rod like member 110 and caged between inner surface of the first end 14 of the first elongated generally hollow housing member 12 and a washer 138 disposed on the elongated rod like member 110 and abutting such pin 132. Such washer 138 may be formed integral with the second elongated rod like member 110. In the presently preferred embodiment of the invention such biasing means 120 is a spring 126. Preferable such spring 126 is a coil compression spring. Preferably, to improve retention and operation of the spring 126, a boss 207 is centrally disposed on the axially opposed second end 204 of the housing member 202 and is received within one end of the spring 216. It will be appreciated that the aperture 205 is then extended through the boss 207. In operation, the end 203 of the housing member 202 is positioned over the sprinkler head (not shown) and essentially protects the sprinkler head (not shown) from damages. The first elongated generally hollow housing member 12 is then pushed downwardly with the end 18 thereof also moving downwardly and enabling the serrations 16 to trim grass around the sprinkler head (not shown). Downward movement of the first elongated generally hollow housing member 12 causes the spring 126 to compress. When the downward movement of the first elongated generally hollow housing member 12 is discontinued, the spring 126 extends pushing the first elongated generally hollow housing member 12 upwardly and away from the second elongated generally hollow housing member 202.

Additionally, there is a means, generally designated, engageable with said first closed end 14 of such first elongated generally hollow housing member 12 for manipulating the apparatus 10 for trimming such grass from around such head portion of such lawn water sprinkler system.

In the presently preferred embodiment of the invention, such manipulating means engageable with the first closed end 14 of such first elongated generally hollow housing member 12 for manipulating the apparatus 10 for trimming such grass from around such head portion of such lawn sprinkler system is one of power driven and manually operated.

In the situation where such manipulating means engageable with such first closed end 14 of such first elongated generally hollow housing member 12 for manipulating said apparatus for trimming such grass from around such head portion of such lawn sprinkler is manually operated a handle (not shown) will be provided.

On the other hand, in the situation where such manipulating means engageable with such first closed end of the first elongated generally hollow housing member 12 for manipulating such apparatus 10 for trimming such grass from around such head portion of such lawn sprinkler is power driven a motor (not shown) will be provided. Such motor may be either electrically powered or gas powered.

Figure 2:
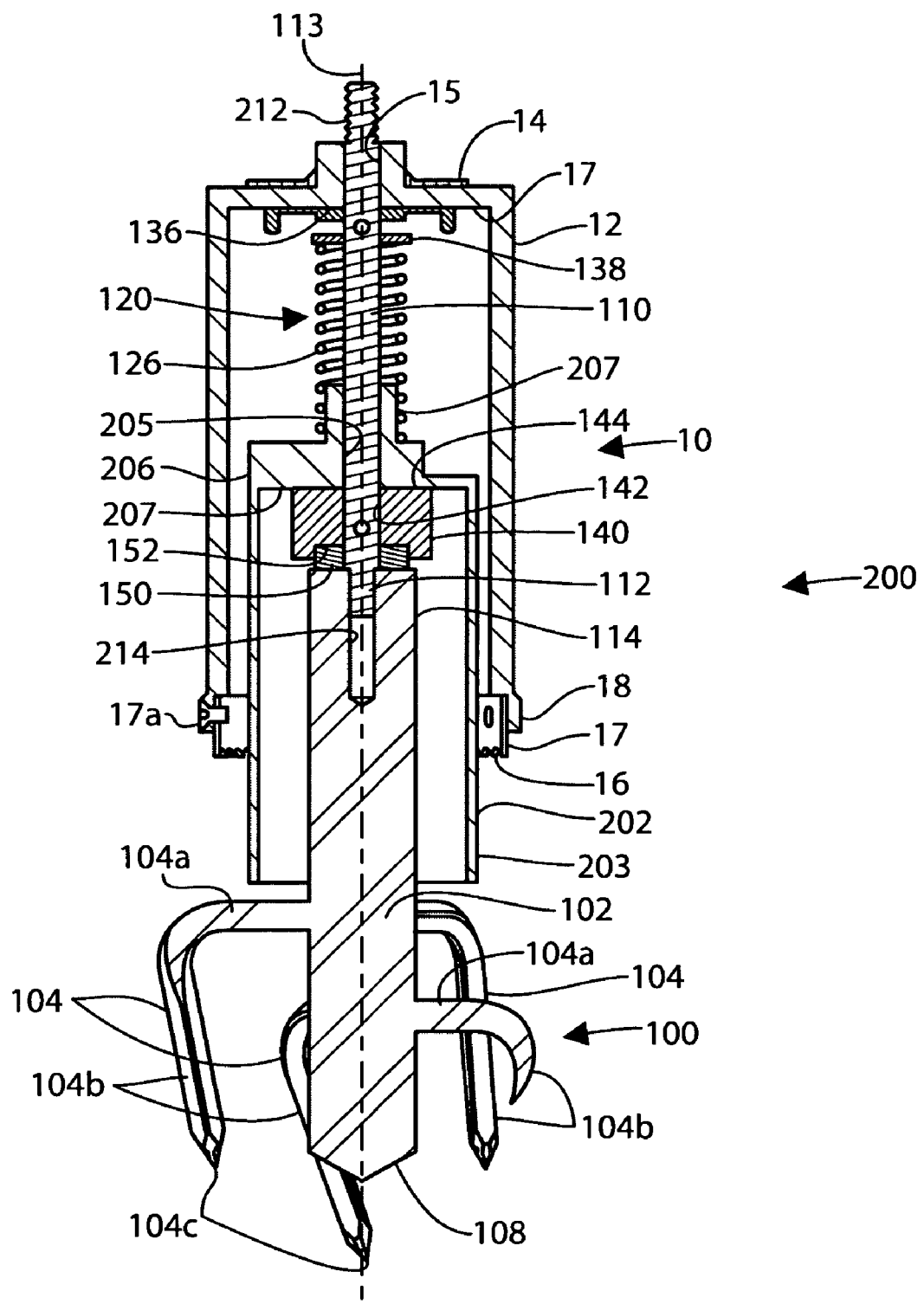
FIG. 2 is an isometric cross-sectional view of the combination garden tiller and grass trimmer for trimming around a lawn water sprinkler head along lines 2-2 of FIG. 1.

Reference is now made, more particularly, to FIGS. 1-2. Illustrated therein is a presently preferred embodiment of an apparatus, generally designated 100 for at least one of tilling, weeding and cultivating a small garden area.

This apparatus 100 includes a first elongated rod like member 102 having each of a predetermined length and a first predetermined cross-sectional shape in a direction transverse to the predetermined length. Such first predetermined cross-sectional shape of the first elongated rod like member 102 will be selected from one of generally round, hexagonal and octagonal. In the most presently preferred embodiment of the invention this first predetermined cross-sectional shape of such first elongated rod like member 102 is generally round.

Another essential component of the apparatus 100 is a predetermined number of generally L-shaped tine members 104. Each of the predetermined number of generally L-shaped tine members 104 has a first leg 104a thereof secured generally perpendicular to a distinct portion of an outer surface 106 of such first elongated rod like member 102 mediate ends thereof and, preferably, closely adjacent a first end 108 thereof. A second leg 104b of the each tine member 104 is disposed one of generally parallel and inclined to the predetermined length of the first elongated rod like member 102 for penetrating a ground surface (not shown) in order to at least one of till, weed and cultivate a small garden area, such as a flower garden. At least a pair of the predetermined number of tines 104 has distal end of the second leg 104b thereof disposed equal distance from the first end 108 of the first elongated rod like member 102

In the presently preferred embodiment of the invention such predetermined number of tine members 104 is six. Additionally, each of such six tine members 104 will include a sharpen point 104c. Preferably, such sharpened points 104c will be heat treated to improve their hardness.

There is a second elongated rod like member 110 engageable at a first end 112 thereof with a second axially opposed end 114 of such first elongated rod like member 102. Accordingly, at least partially threaded aperture 214 is axially formed within the opposed end 114 for threadably cooperating with the threaded end 112.

There is means engageable with a second end 212 of such second elongated rod like member 110 for manipulating the apparatus 100 during such at least one of tilling, weeding and cultivating a small garden area.

In the presently preferred embodiment such means engageable with the second end 212 of such second elongated rod like member 110 for manipulating the apparatus 100 during at least one of tilling, weeding and cultivating a small garden area is one of power driven and manually operated.

In further reference to FIGS. 1-2, illustrated therein is an apparatus, generally designated 200, for at least one of trimming grass from around a head portion (not shown) of a lawn water sprinkler (not shown) and at least one of tilling, weeding and cultivating a small garden area. This apparatus 200 includes a first elongated generally hollow housing member 12 closed at a first end 14 thereof. Such first generally elongated housing member 12 has each of a predetermined length and a predetermined diameter. A center aperture 15 is formed through the first end 14 in substantial alignment with a longitudinal axis of the first elongated generally hollow housing member 12. The peripheral side wall of the first elongated generally hollow housing member 12 is preferably tapered at a predetermined angle from the first end 14 to the axially opposed second end 18 in order to improve rigidity of the first elongated generally hollow housing member 12.

A plurality of serrations 16 are formed on the second axially opposed end 18 of such first elongated generally hollow housing member 12 for cutting grass disposed around such head portion of such lawn water sprinkler.

There is an elongated generally hollow housing member 202 at least partially disposed for reciprocal movement within such elongated generally hollow tubular member 12. In this embodiment of the invention, such elongated generally hollow housing member 202 is open at a first end 203 thereof and has each of a predetermined length and a predetermined cross-sectional shape in a direction transverse to such predetermined length. An aperture 205 is axially formed though an axially opposed second end 206.

A first elongated rod like member 102 is provided and has each of a predetermined length and a first predetermined cross-sectional shape in a direction transverse to such predetermined length. A predetermined number of generally L-shaped tine members 104 are disposed on such first elongated rod like member 102 mediate ends thereof and preferably adjacent a first end 108 thereof for penetrating a ground surface to such at least one of till, weed and cultivate a small garden area. Each of the predetermined number of generally L-shaped tine members 104 has a first leg 104a thereof secured generally perpendicular to a distinct portion of an outer surface 106 of such first elongated rod like member 102 mediate ends thereof and, preferably, closely adjacent a first end 108 thereof. A second leg 104b of the each tine member 104 is disposed one of generally parallel and inclined to the predetermined length of the first elongated rod like member 102 for penetrating a ground surface (not shown) in order to at least one of till, weed and cultivate a small garden area, such as a flower garden At least a pair of the predetermined number of tines 104 have distal end of the second leg 104b thereof disposed equal distance from the first end 108 of the first elongated rod like member 102.

A second elongated rod like member 110 is passed through each aperture 15 and 205 and has a first threaded end 112 thereof extending into the interior of the housing 202. The axially opposed second end 212 of the second elongated rod like member 110 extends outwardly from the first end 14 through the center aperture 15 formed therethrough. Preferably, such second end 212 is threaded. In the most presently preferred embodiment of the invention a cross-sectional shape of such second elongated rod like member 110 is generally hexagonal.

In the presently preferred embodiment of this embodiment of the invention such first elongated rod like member 102 includes a threaded aperture 214 in such second end 114 thereof and the first end 112 of such second elongated rod like member 110 is threaded for threadedly engaging such threaded aperture 214.

A pair of stop members is provided to inhibit axial movement of the second elongated rod like member 110. The first stop member is a pin 132 inserted into an aperture 130 formed through the second elongated rod like member 110 adjacent to and spaced from the second end 212 thereof transverse to the longitudinal axis of the second elongated rod like member 110. Each end of the pin 132 extends outwardly from the outer surface of the second elongated rod like member 110 and abuts an inner surface 17 of the first end 14. The pin 132 is selected from a group consisting of solid, roll, spiral and the like pins generally used for securing a pair of members therebetween. When the first elongated generally hollow housing member 12 is manufactured from materials having lower tensile strength than steel, for example such as plastics, aluminum and the like materials, it has been found necessary to position a washer 136 between such inner surface 17 and the pin 130.

The second stop member 140 preferably has a generally disk shape. Such member 140 further has a center aperture 142 formed therethrough and sized to receive the outer surface of the second elongated rod like member 110. Subsequently, such generally second stop member 140 is secured on the second elongated rod like member 110. The presently preferred method of securing the second stop member 140 is by way of an aperture 146 formed through each of the second elongated rod like member 110 and the stop member 140 transverse to the longitudinal axis 113 of the second elongated rod like member 110 and a pin 148 inserted into such aperture 146 and which may be identical to the above described pin 132. Although it is within the scope of the present invention to employ other methods of securing the second stop member 140 onto the second elongated rod like member 110, including a threaded connection, interference fit, adhesives and the like means. A first end 144 of the second stop 140 abuttingly engages inner surface 207 of the second end 206.

A biasing means 120 is disposed over such second elongated rod like member 110 and caged between inner surface of the first end 14 of the first housing member 12 and a washer 138 disposed on the second elongated rod like member 110 and abutting such pin 132. Such washer 138 may be formed integral with the second elongated rod like member 110. In the presently preferred embodiment of the invention such biasing means 120 is a spring 126. Preferable such spring 126 is a coil compression spring. Preferably, to improve retention and operation of the spring 126, a boss 207 is centrally disposed on the axially opposed second end 204 of the housing member 202 and is received within one end of the spring 216. It will be appreciated that the aperture 205 is then extended through the boss 207. In operation, the end 203 of the housing member 202 is positioned over the sprinkler head (not shown) and essentially protects the sprinkler head (not shown) from damages. The first elongated generally hollow housing member 12 is then pushed downwardly with the end 18 thereof also moving downwardly and enabling the serrations 16 to trim grass around the sprinkler head (not shown).

There is also provided means for absorbing shock during use of the apparatus 200 and preventing overtorque of the first elongated rod like members 102. In accordance with a presently preferred embodiment of the invention, such shock absorption means is a spacer 150 which is manufactured from resilient elastomeric material and which is positioned within a recess 152 formed in the axially disposed second end of the second stop member 140. In operation, the compression of the spacer 150 prevents overtorque of the threaded engagement of the end 114 of the first elongated rod like member 102 with the threaded end 112 of the second elongated rod like member 110 and permits ease of disengagement and removal of such first elongated rod like member 102.

A means engageable with one of such first closed end 14 of such first elongated generally hollow housing member 12 and the second end 212 of such second elongated rod like member 110 for manipulating such apparatus 200 for at least one of trimming such grass from around such head portion of such lawn sprinkler and at least one of tilling, weeding and cultivating a small garden area. The outwardly extending threaded end 212 is advantageous in minimizing repair costs of the apparatus 200 if such threads are damaged during frequent attachment and removal of apparatus manipulating means. When thread 212 is damaged, only the second elongated rod like member 110 is in need of replacement.

It is presently preferred that such tine members 104 are heat treated for hardening and such tine members 104 are secured to such outer surface 106 of the first elongated rod like member 102 adjacent said first end thereof by one of welding and brazing.

In operation, when the apparatus 200 is employed for at least one of tilling, weeding and cultivating a small garden area, the first elongated rod like member 102 is threadably attached to the end 112 of the second elongated rod like member 110. When the apparatus 200 is to be converted for trimming grass from around such head portion of such lawn sprinkler (not shown), the first elongated rod like member 102 is threadably disengaged from the threaded end 112 of the second elongated rod like member 102 enabled by the resilient spacer 150 which may be retained within the seat 152.

After the first elongated rod like member 102 has been removed, the elongated generally hollow second housing member 202 is enabled to retract into the tubular member 102 and, more particularly, allow the serrations 16 to trim such grass.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. An apparatus for at least one of trimming grass from around a head portion of a lawn water sprinkler and at least one of tilling, weeding and cultivating a small garden area, said apparatus comprising:
    (a) a first elongated generally hollow housing member closed at a first end thereof, said first elongated generally hollow housing member having each of a predetermined length and a predetermined diameter;
    (b) a plurality of serrations one of formed on and detachably secured to a second axially opposed end of said first elongated generally hollow housing member for cutting grass disposed around such head portion of such lawn water sprinkler;
    (c) a second elongated generally hollow housing member at least partially disposed for reciprocal movement within said first elongated generally hollow housing member, said second elongated generally hollow housing member being open at a first end thereof and having each of a predetermined length and a predetermined cross-sectional shape in a direction transverse to said predetermined length;
    (d) a first elongated rod like member having each of a predetermined length and a first predetermined cross-sectional shape in a direction transverse to said predetermined length;
    (e) a predetermined number of tine members disposed on said first elongated rod like member for penetrating a ground surface to said at least one of till, weed and cultivate a small garden area;
    (f) a second elongated rod like member passed through axial aperture in each closed end of said first elongated generally hollow housing member and said second elongated generally hollow housing member;
    (g) a threaded connection connecting a first end of said second elongated rod like member with a second axially opposed end of said first elongated rod like member, so that said first elongated rod like member is removable from said second elongated rod like member for trimming grass from around such head portion of such lawn water sprinkler;
    (h) means for inhibiting axial movement of said second elongated rod like member;
    (i) a biasing means disposed over said second elongated rod like member and caged between an axially opposed second end of said second elongated generally hollow housing member and said closed end of said first elongated generally hollow housing member;
    (j) means engageable with at least said second end of said first elongated rod like member for absorbing shock during operation of said apparatus for at least one of tilling, weeding and cultivating a small garden area; and
    (k) means engageable with one of said first closed end of said first elongated generally hollow housing member and said second end of said second elongated rod like member for manipulating said apparatus for at least one of trimming such grass from around such head portion of such lawn sprinkler and at least one of tilling, weeding and cultivating a small garden area.

2. The apparatus, according to claim 1, wherein said predetermined plurality of tine members are heat treated for hardening.

3. The apparatus, according to claim 1, wherein said predetermined number of tine members are secured to said outer surface of said first elongated rod like member adjacent said first end thereof by one of welding and brazing.

4. The apparatus, according to claim 1, wherein each of said each of said predetermined number of generally L-shaped tine members having a first leg thereof secured to a distinct portion of an outer surface of said first elongated rod like member mediate ends thereof, wherein a second leg of said each tine member is disposed one of generally parallel and inclined to said predetermined length of said first elongated rod like member for penetrating a ground surface to said at least one of tilling, weeding and cultivating a small garden area.

5. The apparatus, according to claim 1, wherein said means for inhibiting axial movement of said second elongated rod like member includes each of first and second stops.

6. The apparatus, according to claim 5, wherein said first stop includes:
    (a) a generally disk shaped member;
    (b) a first aperture formed axially therewithin and sized to receive said second elongated rod like member;
    (c) a second aperture formed through each of said second elongated rod like member and said generally disk shaped member transverse to a longitudinal axis of said second elongated rod like member; and
    (d) a pin received within said second aperture.

7. An apparatus, according to claim 5, wherein said second stop includes:
(a) an aperture formed through said second elongated rod like member transverse to said longitudinal axis thereof and adjacent to and spaced from said second end thereof; and
(b) a pin inserted through said aperture adjacent to and spaced from said second end of said second elongated rod like member.

8. The apparatus, according to claim 1, wherein said biasing means is a coiled spring.

9. The apparatus, according to claim 1, wherein said shock absorption means includes a spacer manufactured from resilient elastomeric material.

10. The apparatus, according to claim 9, wherein said spacer is disposed within a recess formed in a predetermined portion of said first stop.

11. The apparatus, according to claim 1, wherein said means for manipulating said apparatus includes a threaded end of said second elongated rod like member protruding beyond said first closed end of said second elongated generally hollow housing member.

12. An apparatus for at least one of trimming grass from around a head portion of a lawn water sprinkler and at least one of tilling, weeding and cultivating a small garden area, said apparatus comprising:
(a) a first elongated generally hollow housing member closed at a first end thereof, said first elongated generally hollow housing member having each of a predetermined length, a predetermined diameter and a tapered side wall;
(b) a first aperture formed axially through said first end of said first elongated generally hollow housing member;
(c) a plurality of serrations one of formed on and detachably secured to a second axially opposed end of said first elongated generally hollow housing member for cutting grass disposed around such head portion of such lawn water sprinkler;
(d) a second elongated generally hollow housing member at least partially disposed for reciprocal movement within said first elongated generally hollow housing member, said second elongated generally hollow housing member being open at a first end thereof and having each of a predetermined length and a predetermined cross-sectional shape in a direction transverse to said predetermined length;
(e) a second aperture formed axially through a second end of said second elongated generally hollow housing member;
(f) a first elongated rod like member having each of a predetermined length and a first predetermined cross-sectional shape in a direction transverse to said predetermined length;
(g) a predetermined number of generally L-shaped tine members having a first leg thereof secured to a distinct portion of an outer surface of said first elongated rod like member mediate ends thereof and a second leg thereof disposed one of generally parallel and inclined to said predetermined length of said first elongated rod like member for penetrating a ground surface to said at least one of tilling, weeding and cultivating a small garden area;
(h) a second elongated rod like member passed through each of said first and second apertures;
(i) a threaded connection connecting a first end of said second elongated rod like member disposed within an interior of said second elongated generally hollow housing member with a second axially opposed end of said first elongated rod like member, so that said first elongated rod like member is removable from said second elongated rod like member for trimming grass from around such head portion of such lawn water sprinkler
(j) a generally disk shaped member having a first end thereof abbutingly engaging an inner surface of said second elongated generally hollow housing member;
(k) a third aperture formed axially therewithin and sized to receive said second elongated rod like member;
(l) a forth aperture formed through each of said second elongated rod like member and said generally disk shaped member transverse to a longitudinal axis of said second elongated rod like member;
(m) a first pin received within said forth aperture;
(n) a fifth aperture formed through said second elongated rod like member transverse to said longitudinal axis thereof and adjacent to and spaced from a second end thereof;
(o) a second pin inserted through said fifth aperture;
(p) a first washer disposed on said second elongated rod like member between said second pin and an inner surface of said first closed end of said first elongated generally hollow housing member;
(q) a biasing means disposed over said second elongated rod like member and caged between an axially opposed second end of said housing member and said washer;
(r) a spacer disposed within a recess formed in an axially opposed second end of said generally disk shaped member and having an axial aperture formed therethrough for receiving therewithin said second elongated rod like member, said spacer manufactured from a resilient elastomeric material for absorbing shock during operation of said apparatus for at least one of tilling, weeding and cultivating a small garden area and for preventing over torque condition of said first elongated rod like member at said threaded connection with said second elongated rod like member; and
(s) a means engageable with one of said first closed end of said first elongated generally hollow housing member and said second end of said second elongated rod like member for manipulating said apparatus for at least one of trimming such grass from around such head portion of such lawn sprinkler and at least one of tilling, weeding and cultivating a small garden area.

* * * * *